United States Patent
Kresse

(10) Patent No.: US 8,352,048 B2
(45) Date of Patent: Jan. 8, 2013

(54) METHOD AND ELECTRONIC DEVICE FOR COMPENSATION OF THE HYSTERESIS OF PNEUMATICALLY DRIVEN FITTINGS

(75) Inventor: Heiko Kresse, Obernkirchen (DE)

(73) Assignee: ABB Technology AG, Zurich (CH)

( * ) Notice: Subject to any disclaimer, the term of this patent is extended or adjusted under 35 U.S.C. 154(b) by 374 days.

(21) Appl. No.: 12/687,629

(22) Filed: Jan. 14, 2010

(65) Prior Publication Data

US 2010/0176320 A1    Jul. 15, 2010

(30) Foreign Application Priority Data

Jan. 14, 2009  (DE) .......................... 10 2009 004 569

(51) Int. Cl.
- *G05B 13/02* (2006.01)
- *G05D 7/00* (2006.01)
- *G05D 11/00* (2006.01)

(52) U.S. Cl. ................ 700/28; 700/44; 700/45; 700/52; 700/282

(58) Field of Classification Search ..................... 700/28, 700/44, 45, 52, 282
See application file for complete search history.

(56) References Cited

U.S. PATENT DOCUMENTS

| | | | |
|---|---|---|---|
| 3,562,620 A * | 2/1971 | Haslehurst | 318/616 |
| 3,866,109 A | 2/1975 | Reed et al. | |
| 5,742,161 A | 4/1998 | Karte | |
| 5,992,229 A * | 11/1999 | Pyotsia et al. | 73/168 |
| 6,094,602 A * | 7/2000 | Schade, III | 700/45 |
| 6,272,401 B1 * | 8/2001 | Boger et al. | 700/282 |
| 6,285,913 B1 * | 9/2001 | Hagglund | 700/45 |
| 6,286,532 B1 * | 9/2001 | van Nieuwstadt et al. | 137/1 |
| 6,523,911 B1 | 2/2003 | Rupp et al. | |
| 6,589,039 B1 | 7/2003 | Doughty et al. | |
| 7,231,265 B2 * | 6/2007 | Yasui et al. | 700/29 |
| 7,275,473 B2 * | 10/2007 | Mohlmann | 91/536 |
| 7,286,945 B2 * | 10/2007 | Zhan et al. | 702/35 |

(Continued)

FOREIGN PATENT DOCUMENTS

DE    195 01 136 C2    7/1996

(Continued)

OTHER PUBLICATIONS

German Office Action dated Oct. 5, 2009 issued in DE 10 2009 004 571.6-14.

(Continued)

*Primary Examiner* — Ronald Hartman, Jr.

(74) *Attorney, Agent, or Firm* — Buchanan Ingersoll & Rooney PC

(57) ABSTRACT

A method and an electronic device for compensation of the hysteresis of a pneumatically driven fitting having an electropneumatic valve. The electropneumatic valve is driven by a position regulator and is used in a closed control loop for position regulation of a switching element of an pneumatic actuating drive for operation of the fitting. Hysteresis of the pneumatically driven fitting is compensated for by the position regulator via at least one hysteresis correction factor. The control-engineering compensation for the hysteresis is carried out separately for a first basic case of starting or reversing a switching element and for a second basic case of continuous movement of the switching element, such that a dominant static friction is compensated for in the first basic case and the dominant sliding friction is compensated for in the second basic case, and the pneumatic actuating drive operates the switching element matched thereto.

11 Claims, 2 Drawing Sheets

U.S. PATENT DOCUMENTS

| | | | |
|---|---|---|---|
| 7,694,936 B2* | 4/2010 | Hoffmann et al. | 251/129.04 |
| 7,797,082 B2* | 9/2010 | Srinivasan et al. | 700/289 |
| 8,024,052 B1* | 9/2011 | Hakala | 700/28 |
| 2001/0037159 A1* | 11/2001 | Boger et al. | 700/52 |
| 2001/0037670 A1* | 11/2001 | Boger et al. | 73/1.72 |
| 2004/0236472 A1 | 11/2004 | Junk et al. | |
| 2007/0045579 A1 | 3/2007 | Wirtl et al. | |
| 2008/0073912 A1 | 3/2008 | Fortmann et al. | |

FOREIGN PATENT DOCUMENTS

| | | |
|---|---|---|
| DE | 196 45 210 A1 | 5/1998 |
| DE | 101 22 776 B4 | 12/2001 |
| DE | 101 42 040 A1 | 6/2002 |
| DE | 102 09 545 A1 | 10/2003 |
| DE | 10 2005 014097 A1 | 4/2006 |
| DE | 10 2005 002387 A1 | 7/2006 |
| EP | 1651485 B1 | 11/2007 |

OTHER PUBLICATIONS

German Office Action dated Jul. 21, 2009 issued in DE 10 2009 004 570.9-14.

German Office Action dated Jul. 22, 2009 issued in DE 10 2009 004 572.4-14.

German Search Report for DE 10 2009 004 569.4 dated Nov. 24, 2009.

ABB Automation Products GmbH, document No. 50/18-19 DE RevA, Jun. 2005 edition (with English translation).

Official Action issued in related U.S. Appl. No. 12/687,679 on Nov. 10, 2011.

Final Official Action issued in related U.S. Appl. No. 12/687,679 on Mar. 6, 2012.

* cited by examiner

METHOD AND ELECTRONIC DEVICE FOR COMPENSATION OF THE HYSTERESIS OF PNEUMATICALLY DRIVEN FITTINGS

RELATED APPLICATION

This application claims priority under 35 U.S.C. §119 to German Patent Application No. 10 2009 004 569.4 filed in Germany on Jan. 14, 2009, the entire content of which is hereby incorporated by reference in its entirety.

FIELD

The present disclosure relates to a method, an electronic device, and a computer program recorded on a computer-readable recording medium for compensation of the hysteresis of a pneumatically driven fitting having an electropneumatic valve.

BACKGROUND INFORMATION

Pneumatic actuating drives are known to include an electronic position regulator to regulate a desired opening level of a fitting, which is connected to the pneumatic actuating drive, on the basis of a predetermined nominal value. By way of example, the fitting can be a process valve within a pipeline system of a process installation. In addition, pneumatic actuating drives can also be used for operation of other industrial fittings and the like.

The product prospectus "Der kompakte, intelligente Stellungsregler" [The compact, intelligent position regulator] (ABB Automation Products GmbH, document number: 50/18-19 DE RevA, June 2005 edition) discloses an electronic position regulator for a pneumatic actuating drive. The position regulator is in the form of a type of electronics box which can be fitted to the outside of the pneumatic actuating drive. The position regulator is a configurable appliance which can communicate, such as by means of a field bus. A functional aspect is the microprocessor-controlled procedure for a regulation program. The nominal value can be preset via a field bus connection which is designed using two-conductor technology. Furthermore, the position regulator has a supply air connection for an air pressure up to a maximum of 6 bar, as well as a working connection for passing on the control pressure generated by the position regulator to the control chamber of the pneumatic position regulator.

In addition, the position regulator has a sensor input for supplying the actual value of the present position of the switching element, which is operated by the pneumatic actuating drive. The actual value of the present position is obtained by means of a position sensor, which is arranged on the switching element. The pneumatic drive for the actuating drive is provided continuously by an I/P module with a downstream 3/3-way valve. The 3/3-way valve controls the passage for ventilation or venting of the actuating drive as proportionally as possible. A closed position, in which all the external connections are blocked, is assumed in a mid-position. The configuration and observation of the operating state of the position regulator can be carried out either by a built-in control panel directly in situ, or centrally via a communication connection, on the basis of the bus protocol by means of a superordinate control unit.

US 2007/0045579 A1 discloses a pneumatic position regulator which is in the form of an I/P module with a 3/3-way valve. The 3/3 switching function allows the switch positions of ventilation, closed position and venting of a working connection, which supplies the control pressure for the connected pneumatic actuating drive. The electropneumatic valve with a 3/3 switching function has two closure elements, which point in mutually opposite directions of the actuating movement and act with the same magnitude with respect to one another. Each of the closure elements bounds an internal control chamber, with a common control pressure connection being associated with the two control chambers. While one closure element is used for ventilation of the working connection, the other closure element is used for venting of the working connection. When neither of the two closure elements is operated, then the valve is in the closed position.

For position regulation, an electropneumatic valve is intended to provide as proportional a response as possible for the electrical drive signal with respect to the pneumatic manipulated variable of the switching element that is supplied, with disturbance variables, which are caused by the forces on the switching element of the fitting and the hysteresis, reacting on the pneumatic side. Furthermore, influencing variables such as temperature fluctuations, pressure fluctuations and the like, can disturb the ideal proportionality ratio. In order to achieve a response which is as linear as possible, the position regulator in some cases takes into account correction values that are determined using sensors. The results which can be achieved in this way are, however, generally not satisfactory. A hysteresis of the valve mechanism forms a significant influencing factor in this case.

Until now, according to known techniques, this problem has been solved by signal processing involving carrying out friction suppression of the sliding friction by means of a fixed correction factor. However, in the starting phase of the valve mechanism from a rest position, the static friction is dominant, and this has not been adequately compensated for.

SUMMARY

An exemplary embodiment provides a method for compensation of the hysteresis of a pneumatically driven fitting having an electropneumatic valve. The exemplary method comprises driving the electropneumatic valve by a position regulator in a closed control loop for position regulation of a switching element of a pneumatic actuating drive for operation of the fitting. The exemplary method also comprises compensating the hysteresis of the fitting by the position regulator via at least one hysteresis correction factor. The compensation for the hysteresis is carried out separately for a first basic case of starting or reversing the switching element and for a second basic case of continuous movement of the switching element, such that a dominant static friction is compensated for in the first basic case and a dominant sliding friction is compensated for in the second basic case, and the pneumatic actuating drive operates the switching element matched thereto.

An exemplary embodiment provides an electronic device for compensation of the hysteresis of a pneumatically driven fitting having an electropneumatic valve, which is configured to be driven by a position regulator in a closed control loop for position regulation of a switching element of a pneumatic actuating drive for operation of the fitting. The device comprises hysteresis compensation means for compensating for the hysteresis of the pneumatically driven fitting by the position regulator via at least one hysteresis correction factor. The hysteresis compensation means implement control-engineering compensation for the hysteresis separately for a first basic case of starting or reversing the switching element and for a second basic case of continuous movement of the switching element, such that a dominant static friction is compensated for in the first basic case and the dominant sliding friction is compensated for in the second basic case, and the pneumatic actuating drive operates the switching element matched thereto.

An exemplary embodiment provides a computer-readable recording medium having a computer program recorded thereon that causes an computing device to compensate for the hysteresis of a pneumatically driven fitting having an electropneumatic valve. The causes the computer to execute operations comprising: driving the electropneumatic valve by a position regulator in a closed control loop for position regulation of a switching element of a pneumatic actuating drive for operation of the fitting; and compensating the hysteresis of the fitting by the position regulator via at least one hysteresis correction factor. The compensation for the hysteresis is carried out separately for a first basic case of starting or reversing the switching element and for a second basic case of continuous movement of the switching element, such that a dominant static friction is compensated for in the first basic case and a dominant sliding friction is compensated for in the second basic case, and the pneumatic actuating drive operates the switching element matched thereto.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
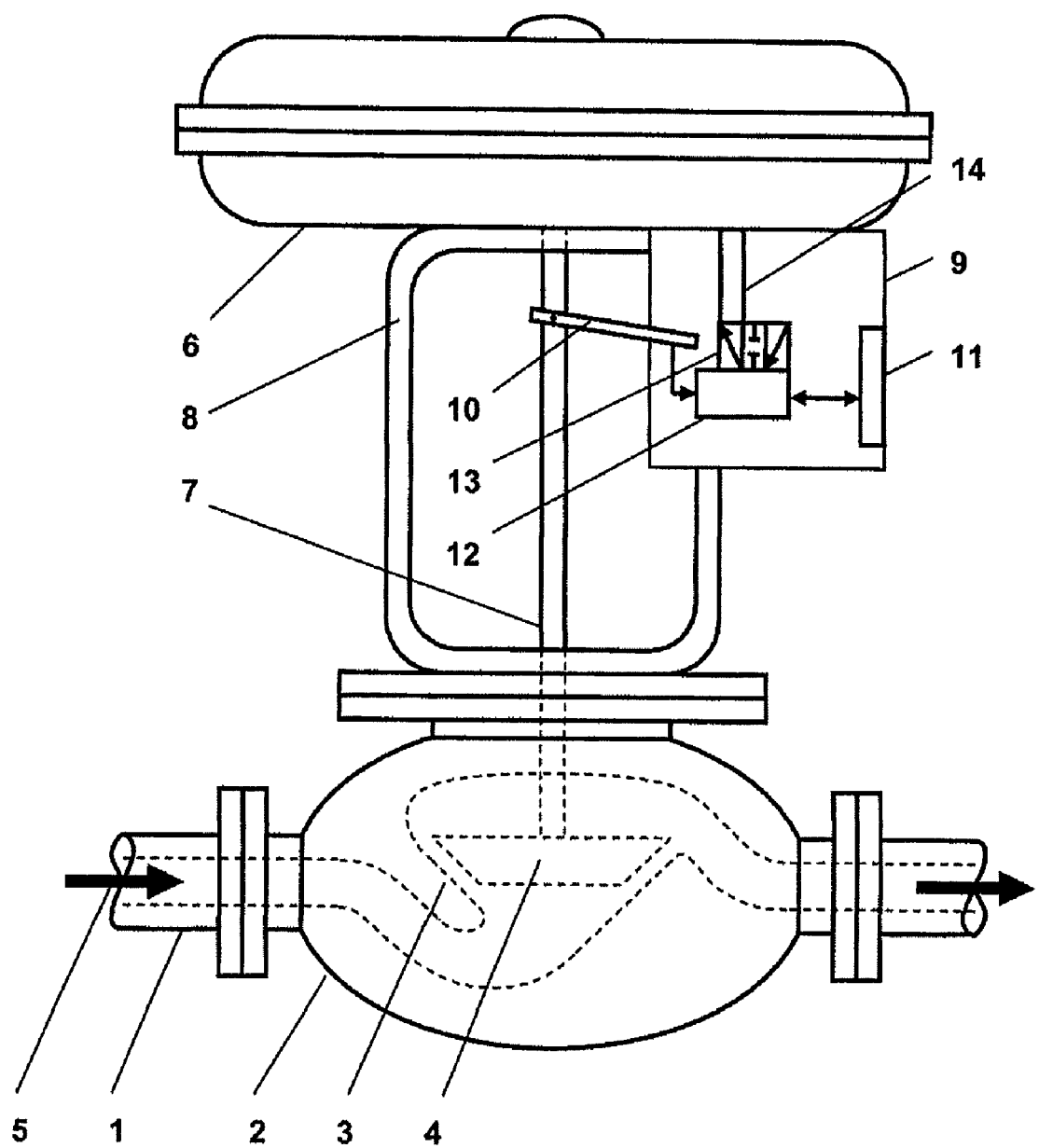
FIG. 1 shows a schematic side view of an exemplary pneumatic actuating drive for a fitting.

Exemplary embodiments of the present disclosure provide a method and an electronic device for compensation of the hysteresis of a pneumatically driven fitting and thereby improving the control quality of the pneumatic actuating drive, by taking into account various causes of the hysteresis.

Exemplary embodiments of the present disclosure provide that the control-engineering compensation for the hysteresis is carried out separately for a first basic case of starting or reversing the switching element and for a second basic case of continuous movement of the switching element, such that the dominant static friction is compensated for in the first basic case and the dominant sliding friction is compensated for in the second basic case, in that the pneumatic actuating drive operates the switching element matched thereto.

An advantageous feature of the present disclosure is that the hysteresis can be compensated for automatically, matched to different characteristics, during operation of the pneumatic actuating element, thus resulting in better control quality—particularly for the phase of starting of the switching element. No specific additional sensors are required for this purpose. The input values can be obtained by means of a position sensor, which can be provided on the switching element, from which a movement characteristic can be determined.

According to an exemplary embodiment, at least one first opening point, which can be determined by the position regulator as a result of signal analysis of the control-loop characteristics for the first basic case, is set in order to drive the electropneumatic valve. This can be done using a second opening point for the second basic case. The control quality of the system can be governed to a critical extent by the definition of the opening points. In other words, the regulation for starting or reversal uses those opening points which were determined based on the corresponding starting criterion. On the other hand, if the switching element is moving, then the opening point determined on the basis of a speed criterion can be used for the existing movement direction.

In the first basic case, the time between the switching element breaking loose and the start of the excitation can be used to measure the control-loop characteristics for definition of the ideal opening points. The time period is therefore considered from the electrical signal preset to the switching element breaking loose, and this is determined using sensors, by means of the position sensor. In order to measure the control-loop characteristics for the second basic case, it is possible to use the mean speed which results between the switching element breaking loose and stopping again. Disturbance influences can be very largely precluded by determining the measured speed.

In order to find the opening point of the electropneumatic valve during initialization, the valve can be energized with a drive signal which corresponds to an estimated opening point, with the control-loop characteristics for this drive signal being measured by using sensors to detect the movement of the switching element. This allows the drive signal to subsequently be varied on the basis of the evaluation result if the determined control-loop characteristic for the present opening point does not correspond to the nominal presets. In the simplest case, this can be achieved by applying a defined offset to the signal.

The exemplary method can be implemented by a computer processing device executing a computer program product as a routine for determining the hysteresis compensation. The computer program product is composed of corresponding control commands stored in software, and can be carried out by an electronic regulation unit. To this extent, the electronic regulation unit comprises at least one microprocessor with a memory unit for storing the software and at least the parameters which influence the process. The electronic regulation unit, which is a component of the closed control loop in the pneumatic actuating drive can be fitted into an electronic device as a position regulator, for example directly fitted to the pneumatic drive for operation of a fitting which is coupled thereto.

FIG. 1 is a schematic side view of an exemplary pneumatic actuating drive for a fitting, according to at least one embodiment of the present disclosure. In the exemplary embodiment illustrated in FIG. 1, an electropneumatic valve is driven by a position regulator and is used in a closed control loop for position regulation of a switching element of a pneumatic actuating drive for a fitting which can be operated thereby. In particular, as shown in the exemplary embodiment of FIG. 1, a fitting 2 is installed in a pipeline 1 of a process installation. According to an exemplary embodiment, the fitting 2 can be in the form of a process valve with a seat structure. In its interior, the fitting 2 has a closing body 4, which interacts with a valve seat 3, in order to control the amount of process medium 5 passing through the fitting 2. The closing body 4 can be operated linearly, as a pushrod, for example, by a pneumatic actuating drive 6 via a switching element 7. The pneumatic actuating drive 6 is firmly connected to the fitting 2 via a yoke 8. A position regulator 9 in the form of an electronic module is also fitted to the yoke 8.

The travel (displacement) of the switching element 7 is detected and signaled to the position regulator 9 by means of a position sensor 10. The detected travel is compared for normal operation with a nominal value, which is supplied from the exterior and is stored in a memory unit 11 (e.g., computer-readable recording medium, such as a non-volatile and/or non-volatile memory), by means of a regulation unit 12, and the actuating drive 6 is driven as a function of a determined control error with respect to the nominal value. The regulation unit 12 of the position regulator 9 has an electropneumatic valve 13 as an I/P converter for conversion of an electrical control error to an adequate control pressure. The electropneumatic valve 13 of the regulation unit 12 is connected to the actuating drive 6 via a pressure medium supply 14. An internal switching membrane, which operates the switching element 7, within the actuating drive 6 is acted on by the control pressure which is supplied via the pressure medium supply 19.

The programming of the regulation unit 12 distinguishes between two basic cases in order to compensate separately for the static friction and sliding friction which occur in this system. For a first basic case of starting or reversing of the switching element 7, the static friction, which is dominant here, is compensated for. On the other hand, in a second basic case of continuous movement of the switching element, the sliding friction which is dominant here is compensated for. This is done by the pneumatic actuating drive 6 in each case operating the switching element 7 matched thereto, by applying offsets of different magnitude to the signal for operation of the switching element 7.

Figure 2:
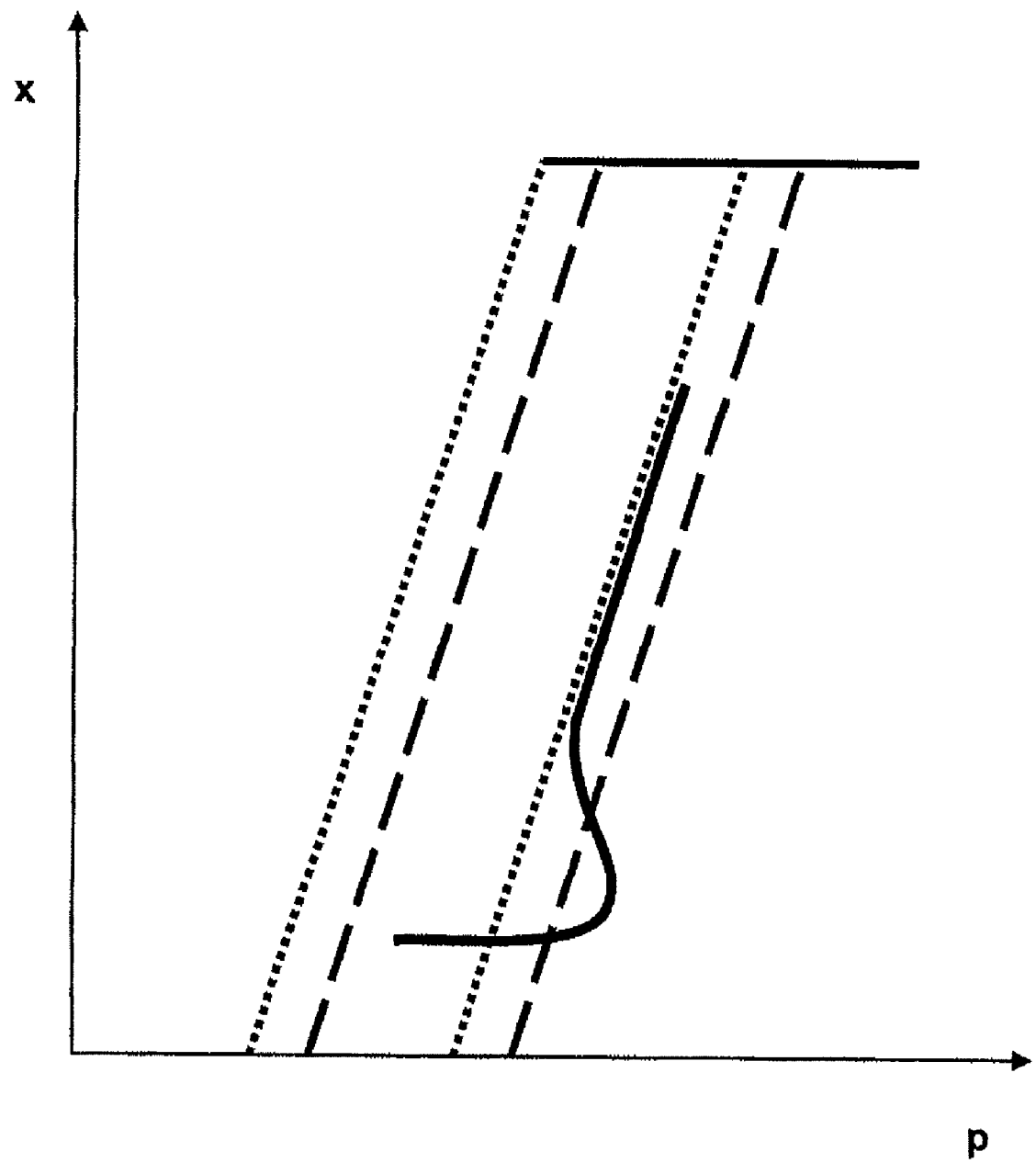
FIG. 2 shows an illustration, in the form of a graph, of an x-p diagram in order to illustrate the hysteresis compensation according to an exemplary embodiment of the present disclosure.

FIG. 2 shows an illustration, in the form of a graph, of an x-p diagram to illustrate the hysteresis compensation according to an exemplary embodiment of the present disclosure. The x-p diagram illustrated in FIG. 2 shows the relationship between the position of the switching element 7 and the pressure, thus resulting in the characteristic that is illustrated here. A different characteristic results for the region of sliding friction (dotted line) than for the region of static friction, as is evident from the trajectory (solid line) which has likewise been introduced in this illustration. Until the switching element 7 moves, the static friction governs the response. After this, the excess energy is converted into a rapid movement. As soon as this has been dissipated, the actuating drive moves along with sliding friction.

The position regulator 9, position sensor 10 and regulation unit 12 were each described above with reference to the respective functions they perform according to an exemplary embodiment. It is to be understood that one or more these elements can be implemented in a hardware configuration. For example, the respective components can comprise a computer processor configured to execute computer-readable instructions (e.g., computer-readable software), a non-volatile computer-readable recording medium, such as the memory element 11, configured to store such computer-readable instructions, and a volatile computer-readable recording medium (e.g., RAM) configured to be utilized by the computer processor as working memory while executing the computer-readable instructions. The position regulator 9, position sensor 10 and regulation unit 12 may also be configured to sense, generate and/or operate in accordance with analog signals, digital signals and/or a combination of digital and analog signals to carry out their intended functions.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Pipeline
2 Fitting
3 Valve seat
4 Closing body
5 Process medium
6 Actuating drive
7 Switching element
8 Yoke
9 Position regulator
10 Position sensor
11 Memory element
12 Regulation unit
13 Valve
14 Pressure medium supply
x Position
p Pressure

What is claimed is:

1. A method for compensation of the hysteresis of a pneumatically driven fitting having an electropneumatic valve, the method comprising:

driving the electropneumatic valve by a position regulator in a closed control loop for position regulation of a switching element of a pneumatic actuating drive for operation of the fitting;

compensating the hysteresis of the fitting by the position regulator via at least one hysteresis correction factor, wherein the compensation for the hysteresis is carried out separately for a first basic case of starting or reversing the switching element and for a second basic case of continuous movement of the switching element, such that a dominant static friction is compensated for in the first basic case and a dominant sliding friction is compensated for in the second basic case, and the pneumatic actuating drive operates the switching element matched thereto; and determining the time between the switching element breaking loose and the start of excitation of the electropneumatic valve to measure control-loop characteristics for the first basic case.

2. A method for compensation of the hysteresis of a pneumatically driven fitting having an electropneumatic valve, the method comprising:

driving the electropneumatic valve by a position regulator in a closed control loop for position regulation of a switching element of a pneumatic actuating drive for operation of the fitting;

compensating the hysteresis of the fitting by the position regulator via at least one hysteresis correction factor, wherein the compensation for the hysteresis is carried out separately for a first basic case of starting or reversing the switching element and for a second basic case of continuous movement of the switching element, such that a dominant static friction is compensated for in the first basic case and a dominant sliding friction is compensated for in the second basic case, and the pneumatic actuating drive operates the switching element matched thereto; and determining an average speed which results between the switching element breaking loose and stopping again to measure control-loop characteristics for the second basic case.

3. A method for compensation of the hysteresis of a pneumatically driven fitting having an electropneumatic valve, the method comprising:
- driving the electropneumatic valve by a position regulator in a closed control loop for position regulation of a switching element of a pneumatic actuating drive for operation of the fitting;
- compensating the hysteresis of the fitting by the position regulator via at least one hysteresis correction factor, wherein the compensation for the hysteresis is carried out separately for a first basic case of starting or reversing the switching element and for a second basic case of continuous movement of the switching element, such that a dominant static friction is compensated for in the first basic case and a dominant sliding friction is compensated for in the second basic case, and the pneumatic actuating drive operates the switching element matched thereto; and
- to determine an opening point of the electropneumatic valve during initialization, energizing the valve with a drive signal which corresponds to an estimated opening point, wherein characteristics of the control-loop for the drive signal are measured with sensors to detect the movement of the switching element, to vary the drive signal on the basis of an evaluation result, if the determined control-loop characteristics for the determined opening point do not correspond to nominal presets.

4. The method as claimed in claim 3, wherein drive parameters for excitation of the electropneumatic valve are predetermined separately for ventilation and venting of the valve.

5. An electronic device for compensation of the hysteresis of a pneumatically driven fitting having an electropneumatic valve, which is configured to be driven by a position regulator in a closed control loop for position regulation of a switching element of a pneumatic actuating drive for operation of the fitting, the device comprising:
- hysteresis compensation means for compensating for the hysteresis of the pneumatically driven fitting by the position regulator via at least one hysteresis correction factor,
- wherein the hysteresis compensation means implement control-engineering compensation for the hysteresis separately for a first basic case of starting or reversing the switching element and for a second basic case of continuous movement of the switching element, such that a dominant static friction is compensated for in the first basic case and the dominant sliding friction is compensated for in the second basic case, and the pneumatic actuating drive operates the switching element matched thereto, and
- wherein the electropneumatic valve has a 3/3 switching function for switch positions of ventilation, closed position and venting.

6. The device as claimed in claim 5, wherein the hysteresis compensation means comprise a regulation unit configured to compensate for the hysteresis of the fitting by the position regulator via the at least one hysteresis correction factor.

7. The device as claimed in claim 6, wherein the regulation unit is configured to distinguish between the two basic cases to compensate separately for the static friction and the sliding friction, and control the pneumatic actuating drive to operate the switching element by applying offsets of different magnitudes to the signal for operation of the switching element.

8. A computer-readable recording medium having a computer program recorded thereon that causes an computing device to compensate for the hysteresis of a pneumatically driven fitting having an electropneumatic valve, the program causing the computing device to execute operations comprising:
- driving the electropneumatic valve by a position regulator in a closed control loop for position regulation of a switching element of a pneumatic actuating drive for operation of the fitting; and
- compensating the hysteresis of the fitting by the position regulator via at least one hysteresis correction factor,
- wherein the compensation for the hysteresis is carried out separately for a first basic case of starting or reversing the switching element and for a second basic case of continuous movement of the switching element, such that a dominant static friction is compensated for in the first basic case and a dominant sliding friction is compensated for in the second basic case, and the pneumatic actuating drive operates the switching element matched thereto, and
- wherein the electropneumatic valve has a 3/3 switching function for switch positions of ventilation, closed position and venting.

9. A computer-readable recording medium as claimed in claim 8, wherein the computer is communicatively connected to a regulation unit of a pneumatic actuating drive for operation of the fitting.

10. A method for compensation of the hysteresis of a pneumatically driven fitting having an electropneumatic valve, the method comprising:
- driving the electropneumatic valve by a position regulator in a closed control loop for position regulation of a switching element of a pneumatic actuating drive for operation of the fitting;
- compensating the hysteresis of the fitting by the position regulator via at least one hysteresis correction factor, wherein the compensation for the hysteresis is carried out separately for a first basic case of starting or reversing the switching element and for a second basic case of continuous movement of the switching element, such that a dominant static friction is compensated for in the first basic case and a dominant sliding friction is compensated for in the second basic case, and the pneumatic actuating drive operates the switching element matched thereto;
- determining, by the position regulator, at least one first opening point, as a result of signal analysis of characteristics of the control-loop for the first basic case, and setting the determined at least one first operating point to drive the electropneumatic valve; and
- determining the time between the switching element breaking loose and the start of excitation of the switching element to measure the control-loop characteristics for the first basic case.

11. A method for compensation of the hysteresis of a pneumatically driven fitting having an electropneumatic valve, the method comprising:
- driving the electropneumatic valve by a position regulator in a closed control loop for position regulation of a switching element of a pneumatic actuating drive for operation of the fitting;
- compensating the hysteresis of the fitting by the position regulator via at least one hysteresis correction factor, wherein the compensation for the hysteresis is carried out separately for a first basic case of starting or reversing the switching element and for a second basic case of continuous movement of the switching element, such that a dominant static friction is compensated for in the first basic case and a dominant sliding friction is compensated for in the second basic case, and the pneumatic actuating drive operates the switching element matched thereto;

determining, by the position regulator, at least one second opening point, as a result of signal analysis of characteristics of the control-loop, for the second basic case, and setting the determined at least one second opening point to drive the electropneumatic valve; and determining an average speed which results between the switching element breaking loose and stopping again to measure the control-loop characteristics for the second basic case.

* * * * *